United States Patent [19]
Graffin

[11] 4,230,195
[45] Oct. 28, 1980

[54] AUTOMATIC CONTROL METHOD AND DEVICE FOR A CONTAINER FILLING APPARATUS

[75] Inventor: Jean-Jacques Graffin, La Ferte-Bernard, France

[73] Assignee: Serac S.A., La Ferte-Bernard, France

[21] Appl. No.: 940,874

[22] Filed: Sep. 8, 1978

[30] Foreign Application Priority Data

Sep. 9, 1977 [FR] France ................................ 77 27407

[51] Int. Cl.$^3$ ................................ G01G 15/00
[52] U.S. Cl. ................................ 177/1; 177/50; 177/54; 177/58
[58] Field of Search .................. 177/1, 50, 54, 53, 52, 177/55, 56, 58

[56] References Cited

U.S. PATENT DOCUMENTS

| | | | |
|---|---|---|---|
| 3,073,400 | 1/1963 | Bauder | 177/56 |
| 3,339,651 | 9/1967 | Garnett | 177/55 |
| 3,484,813 | 12/1969 | Davies | 177/52 X |
| 3,805,903 | 4/1974 | Muskat | 177/50 |

*Primary Examiner*—Joseph W. Hartary
*Attorney, Agent, or Firm*—Cushman, Darby & Cushman

[57] ABSTRACT

The method comprises the steps of sequentially taking containers filled in a multi-station filling machine, of weighing each of said taken containers, of comparing said weighing to a preset value for the filling devices of the filling machine and of establishing a correlation between each taken and weighed filled container and the corresponding filling station of the filling machine. In a filling machine comprising a rotation filling apparatus having n filling stations, the control device comprises at least a rotating transfer apparatus arranged in series with the rotating filling apparatus with interposition of at least an intermediary transfer wheel. The rotating transfer apparatus comprises $n_1$ stations among which $n_1$-1 passive stations and a control weighing station provided with a balance, numbers n and $n_1$ being incommensurable numbers. Controlled actuating means are provided on the circular path of the filling devices of the rotating filling apparatus for cooperation with controllably actuable members of said filling devices to vary the setting of said filling devices in accordance with the measured control weighings on the rotating transfer apparatus.

20 Claims, 11 Drawing Figures

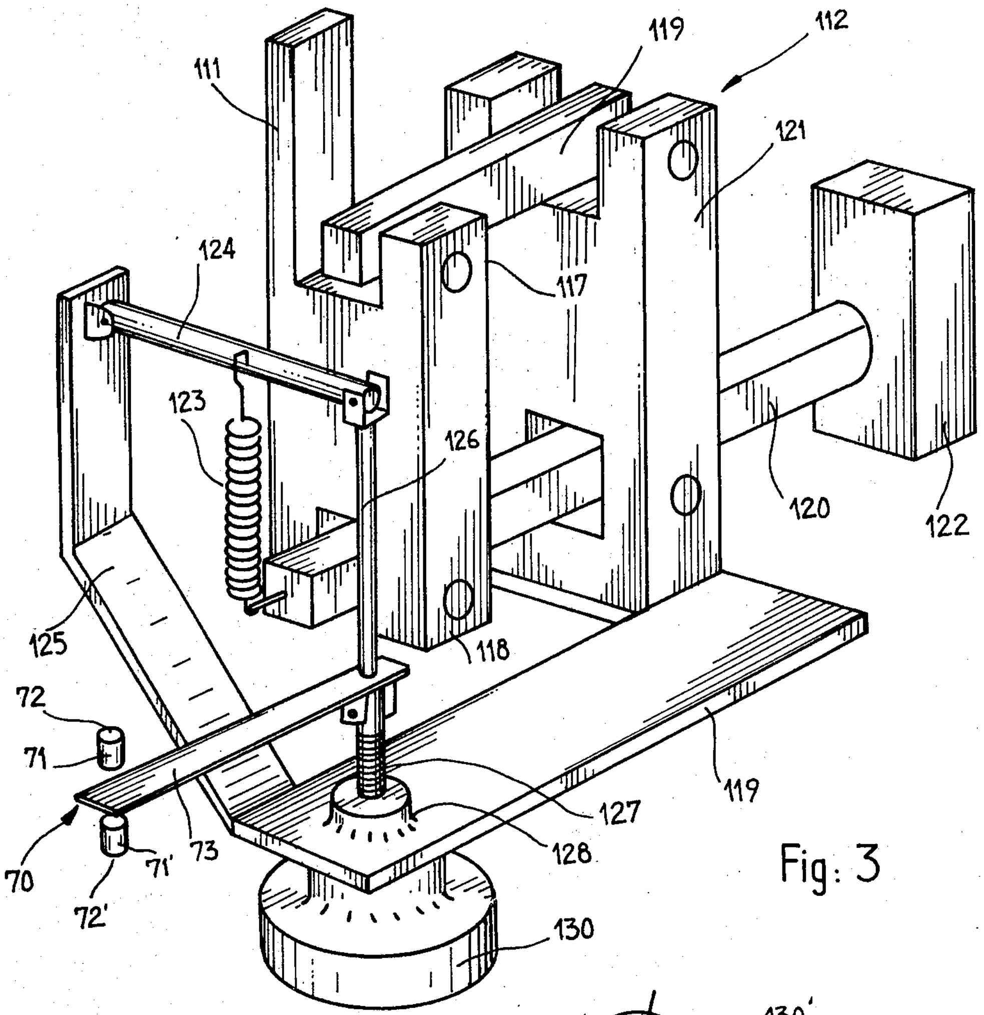
Fig: 3
Fig: 4
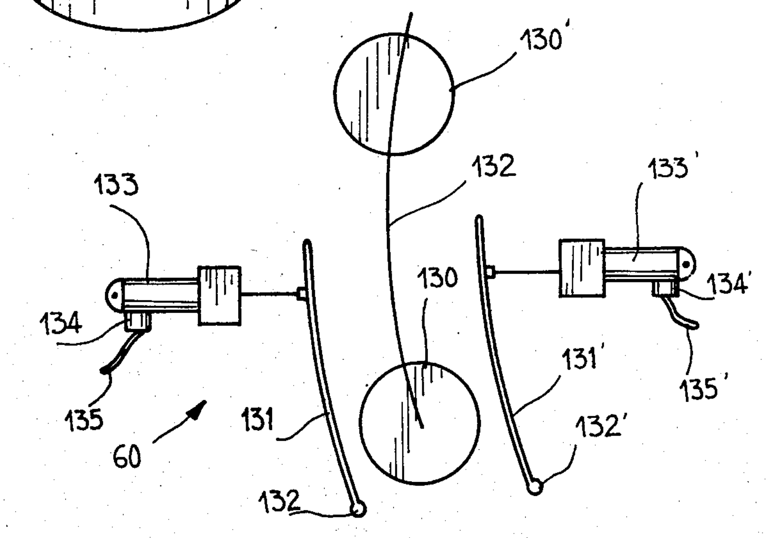

Fig: 6
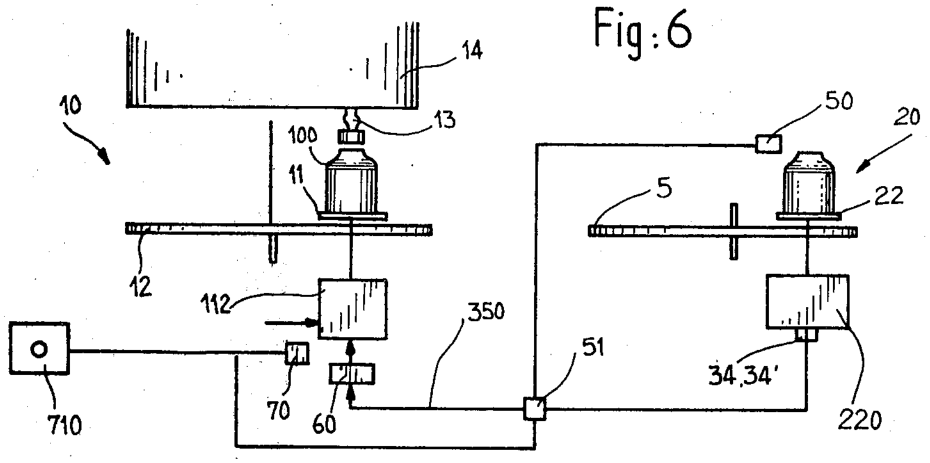
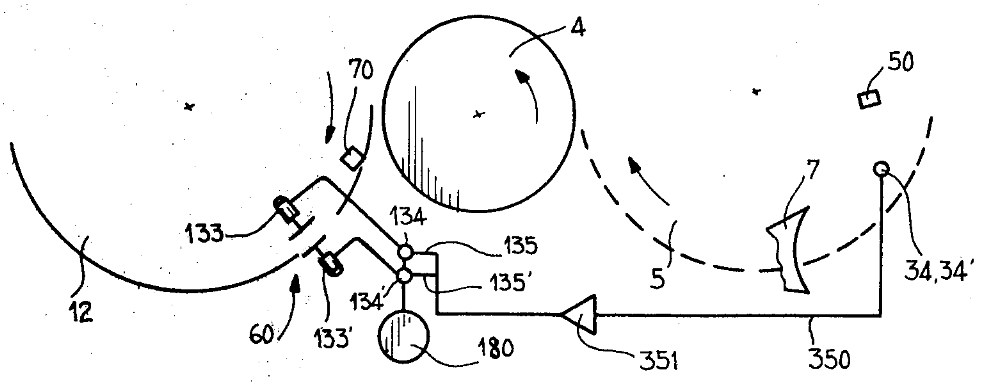
Fig: 7
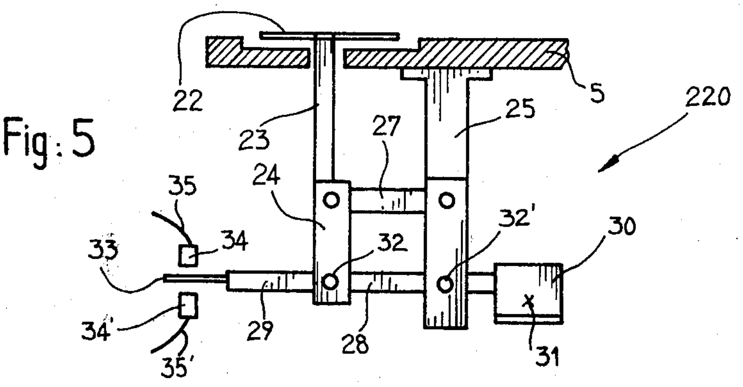
Fig: 5

AUTOMATIC CONTROL METHOD AND DEVICE FOR A CONTAINER FILLING APPARATUS

BACKGROUND OF THE INVENTION

1. Field of the Invention

The present invention relates to filling machines of a conditioning plant and more particularly to a method and a device for sequentially selecting and weighing containers which have been filled on a filling machine and for selectively establishing a correlation with the respective filling stations of the machine for eventually correcting the amounts of material delivered into the containers in said filling machine.

The present invention also relates to a method for sequentially selecting the filled containers, for controlling the amount of material delivered into the containers and for correcting the weight of material to be delivered at the respective filling stations of the filling machine with respect to a reference value.

The present invention relates more particularly, but not exclusively, to rotative weighing filling machines.

Multi-station rotative filling machines of the weighing type generally comprise a rotating assembly including a hopper or a tank for the material to be filled, a plurality of filling heads, and weighing metering stations disposed below said filling heads and functionally connected thereto.

In operation, the containers to be filled are continuously fed to the respective weighing stations where they control the opening of the filling heads whereby, when the required amount, e.g. weight, of material has been delivered from the tank into the containers, the weighing control device of each weighing metering station generates a signal for shutting the corresponding filling head. The filled container is thus forwarded toward a shutting or sealing machine.

The weight of the material dispensed within a container must be legally within a given range around a predetermined value and it is essential that storage conditioning will be permanently made with machines fullfilling said legal requirements.

2. Description of the Prior Art

Weight control is generally normally performed as follows:

selecting at the outlet of the filling machine a number of successive filled containers equal to the number of the stations in the machine and establishing a correlation between said series of containers and the filling stations of the machine where they have been filled;

weighing on an external check-weigher said selected filled containers;

eventually repeating later said operations;

determining and plotting the weight standard deviation with respect to the authorised range; and adding or withdrawing calibrated weights on the faulty weighing metering stations for adjustment of the stations which deliver an amount of material beyond the authorized range.

Said manual operations as a whole are easy to be carried on, do not imply the machine to be stopped and only require localized external intervening, i.e. adding or withdrawing calibrated weights.

However, when it is required to package with such a machine materials of different nature or when the capacity or the form of the containers to be filled vary in a same packaging line, said control operative steps has to be effected for each of said modifications.

Moreover, with usual minimum rates of productions, for instance of about 7,000 one-liter containers per hours, more than 100 containers leave the filling machine each minute, i.e. about two containers per second. If the packaging rate is doubled or tripled, as it is usually required nowadays, or if the containers are smaller (for instance half-liter containers) and thus more quickly filled, the delivery rate of filled containers is such that the operator has difficulties in doing the control steps, as above described.

If there are combined problems in production rate and of packaging modifications in a same packaging line, the control becomes excessively time-spending and critical, whereby increasing the risks of errors and operating costs of said machine.

It has been accordingly found desirable to provide a filling machine of the above described type with means capable of:

(a) automatically carrying out a comparison weighing of the containers which have been filled on each filling station;

(b) indicating the measured deviation, if any;

(c) directly acting on each related filling station for which a deviation has been established; and (d) repeating control weighing after adjustment for controlling said adjustment.

A typical multi-station weight controlled filling machine to which the present invention may be applied is disclosed in French Pat. No. 2,168,696 which is incorporated here for reference.

SUMMARY OF THE INVENTION

There is accordingly a primary object of the present invention to avoid the above mentioned control drawbacks by providing in a multi-station filling machine a means for automatically sequentially selecting containers filled in said filling machine, for controlling and correcting the amount of material delivered within the containers at various filling metering stations in a filling machine with respect to a preset reference value.

There is another object of the invention to provide a device for automatically correcting adjustment of each filling metering device delivering a preset amount of material to the containers to be filled.

There is yet another object of the invention to provide a device for automatically correcting adjustment of a metering station with respect to the deviation which has been stated on a predetermined number of thus selected and controlled containers filled at this station with respect to a given weight range.

There is a further object of the invention to provide, in a filling machine of the weighing type, a weighing metering means the calibration of which may be automatically adjusted.

Another object of the invention is to provide a control means for correcting adjustment of the respective weighing metering devices which effects positive or negative constant incremental corrections of the calibration of the weighing metering device for each signal generated by the control means.

A filling machine according to the invention comprises, as shown in FIG. 1, at least a rotating filling apparatus, generally designated by reference numeral 10, and a rotating transfer apparatus, generally designated by reference numeral 20. Containers 100 which have been filled in the rotating filling apparatus with a measured amount of filling material are delivered from the rotating filling apparatus 10 to the rotating transfer apparatus 20 which is driven in synchronism with the rotating filling apparatus The transfer apparatus 20 is provided, on its periphery, with a given number or receiving stations which all consist, except one, in simple holding receptacles 21 for the containers. The total number of the stations of the rotating transfer platform 20 and the total number of filling/metering stations of the rotating filling assembly 10 are, according to the present invention, incommensurable numbers, whereby it results therefrom that the stations 21 of the transfer platform receive, in a repetitive sequential algorithmic manner, the containers from the filling assembly 10. A station 22 among the $n_1$ stations of the transfer apparatus comprises a weighing device for weighing the successive containers it receives from the filling apparatus, as it will be detailed hereinbelow.

According to a feature of the present invention, more particularly directed to filling machines of the weighing type, the station 22 of the transfer platform provided with the weighing device gives a signal when the weight of a sensed filled container 1 is over or below a predetermined value or range. The signal is eventually fed to a device adapted for acting on the incriminated weighing/metering station of the filling assembly 10 so as to correct the adjustment thereof whereby restoring the amount of the material delivered into the containers by said station within the required range, i.e. in the acceptable limits defined by the legal requirements.

According to another feature of the present invention, the signal from the control weighing station is stored and a correction signal is fed to the device for correcting calibration of the considered filling station only when a predetermined number of errors of a same sign, i.e. in excess or in deficiency with respect to a given weight value in a predetermined range, have been established and stored for a same filling station. This prevents untimely corrections when a parameter related to the weighing metering station itself or to other external parameters capable of affecting the amount of delivered material should momentarily but unrepeatedly vary (for instance sudden fluctuation in the level of the material within the filling tank, obturation of a filling head or the like).

The weighing device at the weighing station of the transfer apparatus generates, as above mentioned, signals which are an image of the sensed weight of the successive containers sensed by said weighing device. Signals may be stored and analyzed, according to the invention, in different manners, i.e. for instance:

by comparing the sensed weight to a predetermined weight range with respect to a given percentage of the required preset value; for instance, for a weight of 1000 g of water or a liter, the comparison range will be of ± 10 g and the control device of the transfer platform carries out a simple comparison;

by measuring maximum and minimum absolute weight values, for instance 1010 g and 990 g, whereby the control device of the weighing station of the transfer platform carries out a real weighing.

In both cases, the signals from the weighing station of the transfer platform will be advantageously stored and analyzed, either with respect to threshold values corresponding to maximum and minimum weight limites, or with respect to a predetermined standard deviation of weight. In said latter case, the control device includes a means for calculating a standard deviation and adapted to give output signals for each calculated standard deviation greater than a given threshold value for selectively actuating the device for correcting the calibration of the weighing balance of the related filling station.

Additionally, the control device, independently of the chosen correction mode, may be connected in parallel to a printer or plotter to give the user a survey of the measurements. Moreover, in the case where, after correction, the required weight for the material to be delivered within a container has not been reached at a given faulty filling station, the control device may give a signal for stopping the machine and displaying the number of the defective filling station, whereby permitting an immediate identification thereof for repairing or replacement purposes.

With the device of the invention, it is thus possible, with a single comparison balance, separate from the filling assembly and accordingly located in environmental conditions less hostile than in the vicinity of the filling stations, and without disturbing the continuous run of the machine to individually and periodically control each metering device of the filling stations of the filling machine so as, either to correct the calibration of said metering device when the detected fluctuations are within the adjustment range of said device, or to actuate alarm means and stop the machine when at least one of said filling stations is seriously faulty, whatever the production rate or the quantities of product to be packed are.

BRIEF DESCRIPTION OF THE DRAWINGS

Further features and advantages of the present invention will become apparent from the following description taken in conjunction with preferred embodiments thereof with reference to the accompanying drawings, in which:

FIG. 3 is a perspective view of the weighing balance at the filling/weighing station of the filling machine shown on FIG. 2;

FIG. 4 schematically shows an embodiment of a correction device for the balance shown on FIG. 3;

FIG. 5 shows an embodiment of the control balance at the sensing weighing station of the transfer platform;

FIG. 6 is a diagramatic view of an embodiment of the automatic correction device of the invention;

FIG. 7 is a diagramatic top view of the filling machine showing the location of the main integers of the device shown on FIG. 6;

DETAILED DESCRIPTION OF THE INVENTION

Figure 1:
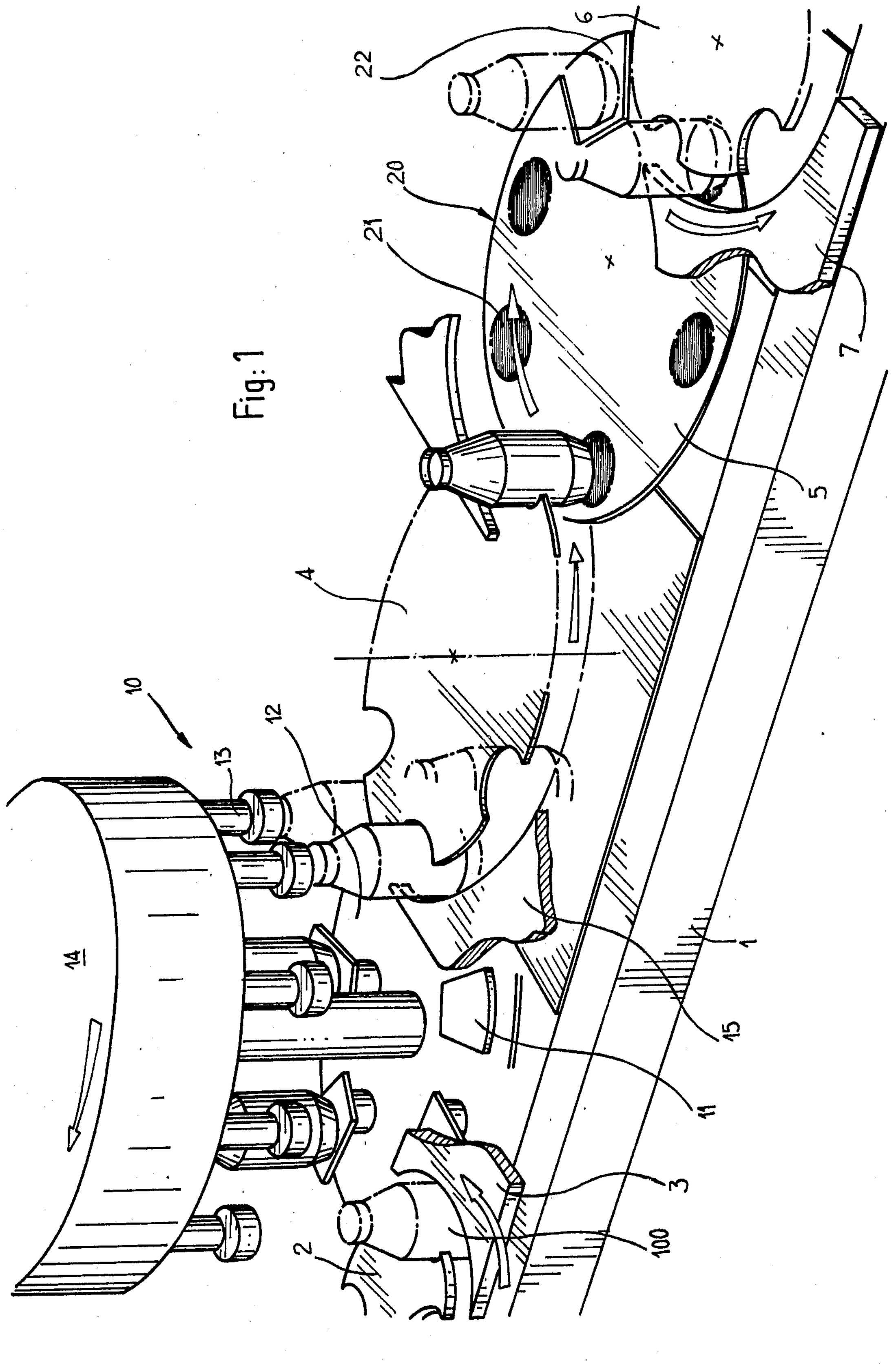
FIG. 1 is a schematic perspective view of a rotating filling machine including the control device of the invention.

The filling machine shown on FIG. 1 comprises a linear panel conveyor, generally designated by reference numeral 1, for conveying empty containers toward a rotating filling assembly 10 and also for taking out the filled containers after they have been conveyed by a transfer platform 20 toward further treatment stations.

Containers 100 are removed from the conveyor 1 and transferred onto weighing pans 11 carried by the rotating table 12 of the rotating filling assembly by rotating wheels 2 cooperating with a stationary guide 3 extending above the conveyor 1. Containers 100 are thus positioned under filling heads 13 disposed below a constant level liquid tank 14. Filling heads 13 are preferably, but non exclusively, of the magnetic type.

Containers 100 are filled and weighed on the pans 11 as it will be explained hereinbelow, and are removed from the filling assembly 10 by a rotating transfer wheel 4 cooperating with a guide 15. Instead of being transferred again directly onto the conveyor 1 or toward a second rotating filling assembly in parallel with the first rotating filling assembly 10 as in known machines, the containers conveyed by the transfer wheel 4 are transferred to a rotating transfer platform 20 which rotates in synchronism with the transfer wheel, and accordingly with the filling assembly 10. The transfer platform 20 is provided, near its periphery, with a plurality of angularly spaced receiving stations 21 for receiving and holding the containers from the transfer wheel 4, one of said receiving stations comprising a pan 22 of a comparison balance 220. The number $n_1$ of the stations of the rotating transfer platform, i.e. the totality of the "dead" stations 21 and the station with balance 220, and the total number n of the stations 11 of the rotating filling assembly are incommensurable, as above mentioned. The containers conveyed by the transfer platform 20 are taken out by a second or terminal transfer wheel 6 cooperating with a guide 7 so as to be redeposited onto the conveyor 1 for being forwarded toward further treatment stations.

Figure 2:
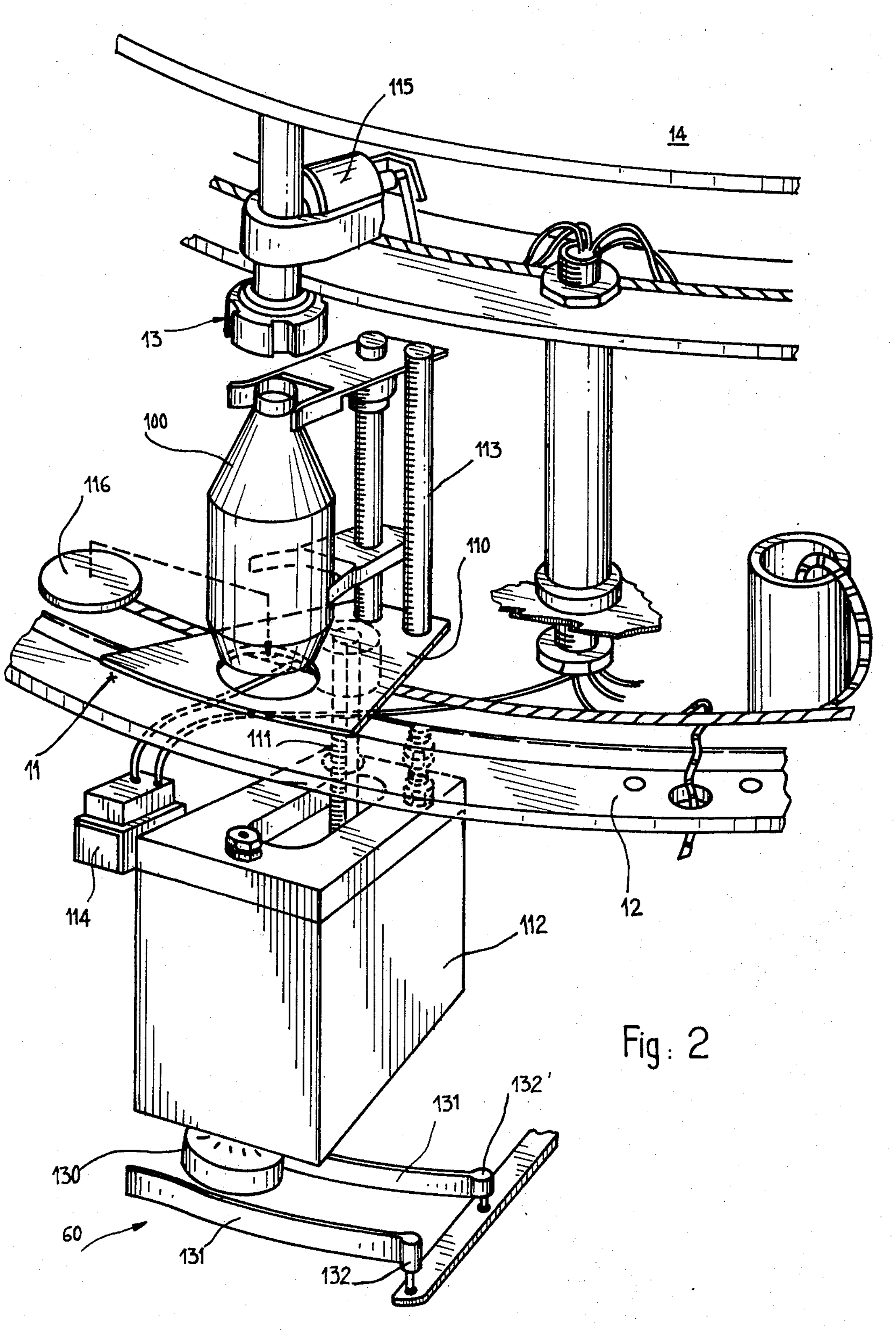
FIG. 2 is a perspective view of a filling/metering station of a rotating filling machine of the weighing metering type.

There is shown at a larger scale of FIG. 2 one of the weighing delivery stations 11 of the rotating filling assembly 10 with a container 100 in position ready to be filled under a filling head 13. The filling station comprises a weighing pan 110 connected by a rod 111 to a balance, generally designated by the reference numeral 112, arranged below the rotating table 12 of the filling assembly and secured thereto. The pans 110 are shaped and dimensioned to generally correspond to the containers they receive and they comprise an upright member 113 for positioning and holding the container on the pan. The balance 112 comprises a comparison device 114 producing signals for controlling the actuating device 115 of the filling head 13, so as to shut the filling head when the quantity of liquid corresponding to a preset weight has been delivered into the container 100 and weighed by the balance 112 associated to said particular filling head. Setting or calibration weights 116 may be selectively disposed on the weighing pan 110 depending upon the size of the containers to be filled and upon the required quantities of liquid to be delivered.

There is shown on FIG. 3 an embodiment of a weighing balance 112 for a filling metering station as shown on FIG. 2. The rod 111 enlarges at its lower end in a dual calliper or fork assembly 117 and 118 within which are rotatably mounted a link 119 and a rod 120 forming the balance beam, respectively, the beam 120 being hingedly mounted near the midpart thereof in a stationary frame member 121, connected to the lower side of the rotating table 12, whereby constituting with the link 119 a hinged parallelogram structure. At the end of the beam 120 opposite to calliper 118 is adjustably, e.g. slidably mounted a weight 122 forming the counterweight of the balance. The opposite end of the beam 120 protruding from the calliper 118 is connected through a spring 123 to a link 124. The link 124 is hingedly mounted at one end on a stationary strut 125 integral with the frame member 121 of the balance, and is hingedly connected at its opposite end with a vertical rod 126. The rod 126 has its lower end prolongated by a threaded rod 127 passing through a boss 128 in a plate 129 integral with the frame member 121 and the strut 125. The lower end of the threaded rod 127 protruding beyond, e.g. below the plate 129 is received in a tapped bore of a pulley 130 which is freely mounted for rotation on the plate 129, for instance by means of a roller bearing (not shown). It will be understood that in such an arrangement, a rotation of the pulley 130 will induce a linear vertical displacement of the threaded rod 127 whereby achieving, through the link 124 and the spring 123, a correction of the calibration of the balance for a counterweight having a given weight 122 in a given position. The weight of said counterweight 122 is preferably quite equal to the nominal weight of material required for the filling of the containers.

Thus, by providing hinged guide rails 131 and 131' in a selected location on both sides of the circular path 132 for the pulleys 130 when the rotating filling assembly is rotated, and by selectively displacing laterally the rails 131 or 131' toward the position where the successive pulleys 130 may selectively come into rolling contact with one of said rails by a simple contact engagement when travelling on their circular path, the pulley 130, when contacting one of said rails, will be rotated around its axis of a given angular increment, whereby modifying the setting of the balance 112.

The rails 131, 131' are hingedly mounted by one of the ends thereof 132 or 132' on a stationary member and have a length determined so as the total correction affected when a pulley 130 rolls over one of said rails substantially corresponds to the half free run of the balance 112 in its balancing range. Thus, with containers of 1000 g, the sensitiveness of the balance may be chosen ±2 g, the unitary correction expected from the rails 131 and 131' being thus determined to correspond to a variation of 2 g of the setting of the balance. The guide rails may be actuated by hydraulical, pneumatical or electrical cylinder means 133 and 133' connected to a convenient power source (not shown) and controlled by control device 134 and 134' (FIG. 4) connected through lines 135 and 135' to a control device actuated by the signals from the control balance 220 on the rotating transfer platform 20.

There is shown in FIG. 5 an embodiment of said control balance 220 provided on the transfer platform 20. In said embodiment, the control balance 220 is similar in structure to the weighing balances 112 of the filling metering stations of the filling assembly shown in FIG. 3, the pan 22 slightly protruding from the upper surface of the table 5 of the transfer platform 20 and being rigidly connected to a rod 23 extending downwardly below the table 5 of the platform 20. The rod 23 prolongates in a block 24 forming a dual calliper or fork within which are rotatably mounted a link 27 and a beam 28, respectively, said link and said beam being also hingedly mounted in a calliper structure 26 prolongated by a support member 25 integral with the table 5 of the transfer platform. The comparison balance 220 distinguishes over the weighing balances in that the beam 28 is steady balanced, the counterweight 30 having its center of gravity 31 slightly offset downwardly from the pivoting axes 32 and 32' of the beam 28 in the callipers 24 and 26. The beam 28 is prolongated outwardly by an end portion 29 opposite to the counterweight 30, said end portion 29 being in turn prolongated by a metal leaf 33 extending radially with respect to the axis (not shown) of the table 5 of the transfer platform and adapted to pass, when the transfer platform rotates, between two stationary proximity detectors 34, 34', mounted on a frame of the filling machine, located on both upper and lower sides of the circular travelling path of the leaf 33 and adapted for supplying control signals through lines 35 and 35', for instance with interposition of amplifying/adapting devices, to the actuating members 133 and 133' of the correction device 60 for the weighing balances of the weighing/metering stations of the filling platform.

With such an arrangement, position of the proximity detectors 34 and 34' and setting of the balance 220 being determined to correspond to a given weight range, for instance the legally required limits, an over-weighing or an under-weighing beyond said predetermined range will result in the production of a control signal for a positive or negative correction of an incremental amount of the weighing balance of the particular filling station delivering a quatity of material out of said limits.

FIG. 6 is a diagramatic view of an automatic correction device of the invention. In said figure, as also in the succeeding figures, the integers which have already been identified on the preceeding figures have the same reference numerals. In FIG. 6, a weighing/metering balance 112 is shown in its position of cooperation with a correction device 60 of the type disclosed in reference with FIG. 4. In a same way, the control balance 220 on the table 5 of the transfer platform 20 is shown in its position of controlling the corresponding weighing balance 112, i.e. in a balance of the type disclosed with reference to FIG. 5, with the leaf 33 passing between the detectors 34, 34', the transmission lines 35 and 35' merging here for clarity sake in a line 350 connected to the input of the correction device 60.

There is shown in FIG. 7 a possible relative location of the correction device 60 and of the detection zone for the control weighing defined by detectors 34 and 34'. The comparison weighing zone is advantageously located before the area where the containers on the table 5 of the transfer platform 20 are taken out by the end wheel 6 and the associated guide 7. The correction device 60 is advantageously located downstream the transfer wheel 4 so as to permit correction of the setting of the weighing/metering balances while they are empty and before they receive the next containers to be filled. As shown in FIG. 7, the mechanical driving mechanism for rotating in synchronism the table 12 of the filling apparatus, the transfer wheel 4 and the table 5 of the transfer platform, establishes a mechanical, i.e. geometrical correlation between the position of the control weighing station in the detecting zone at 34, 34' and the correction device 60 so as each comparison weighing sensed by the detector 34, 34' forwards through line 350 a correction control signal to the correction device 60 for correction of the balance of the filling apparatus 10 from which issued the container 7 located at the considered moment on the control balance 220 of the transfer platform.

Each balance 112 of the filling apparatus 10 is thus successively controlled by the comparison balance since the numbers of the stations on the both platforms are incommensurable numbers. In addition to said essential feature of being a prime number with the number of the stations of the filling apparatus, the number of stations of the transfer platform is determined with respect to the operating rate of the machine so as to carry on a comparison weighing and, if required, a correction of the corresponding weighing/metering balance at a given periodicity. Thus, the more the number of the stations of the transfer platform is great, the more the interval of time between two successive comparison/correction weighings for a given station of the filling apparatus is great, i.e. corresponds to a greater number of containers having been filled therebetween. With such an arrangement, it is possible to introduce, in a continuous control and correction mode, a selective periodicity of the correcting steps of the different balances of the filling apparatus. In a typical example, with a filling apparatus having 24 stations, the number of stations of the transfer platform will be advantageously 23.

There is better shown in FIG. 7 connections between line 350 from the detectors 34 and 34' and the correction device 60 of the guide rails and cylinder type disclosed with reference to FIG. 4. In said embodiment, the cylinders 133, 133' are connected to a source of fluid under pressure 180 through electrovalves 134 and 134', the electrical inputs of which 135 and 135' are connected to the line 350 so as to transform the electrical signals from the detectors 34, 34', amplified by a convenient amplifier 351, in variations of pressure. The cylinders 133, 133' may be simple acting resiliently urged cylinders or double acting cylinders.

In order to prevent the comparison balance 220 from forwarding correction signals when no container is on the pan 22 of the comparison balance, the device of the invention is further provided with a presence detector unit 50 for sensing the presence of a container on the balance. Said detector unit consists for example in an optical detector or a mechanical contact unit adapted to inhibit through a logic circuit means 51 the transmission of the signals from the comparison balance 220, the circuit 51 being for instance a OR gate. The sensing unit 50 is advantageously located upstream the position of the detectors 34, 34' with respect to the direction of rotation of the transfer platform 20.

In the same way, in order the correction signals are transmitted only in the case where the considered weighing/metering balance of the filling platform is so saturated and is accordingly capable of conveniently receiving a setting correction, i.e. essentially when the balance beam is not at one of its extreme positions corresponding to the limits of the weighing range, a control device 70 is additionally provided for detecting the operative positions of the movable parts of the balance.

Said control device 70 may consist, as shown in FIG. 3, in two proximity detectors 71 and 71' while are stationary mounted on the frame of the filling apparatus, for detecting the position of a leaf 73 integral with the rod 126 of the weighing balance 112 and extending radially with respect to the axis of the rotating filling apparatus. The vertical position of the leaf 73 gives an image of the position of the beam 120 with respect to its balanced position. The control device 70 may be advantageously connected to a display and alarm device 710 indicating that at least one of the balances of the filling platform is unserviceable, whereby permitting a visual inspection of said balances for rectification or repair purposes.

Figure 8:
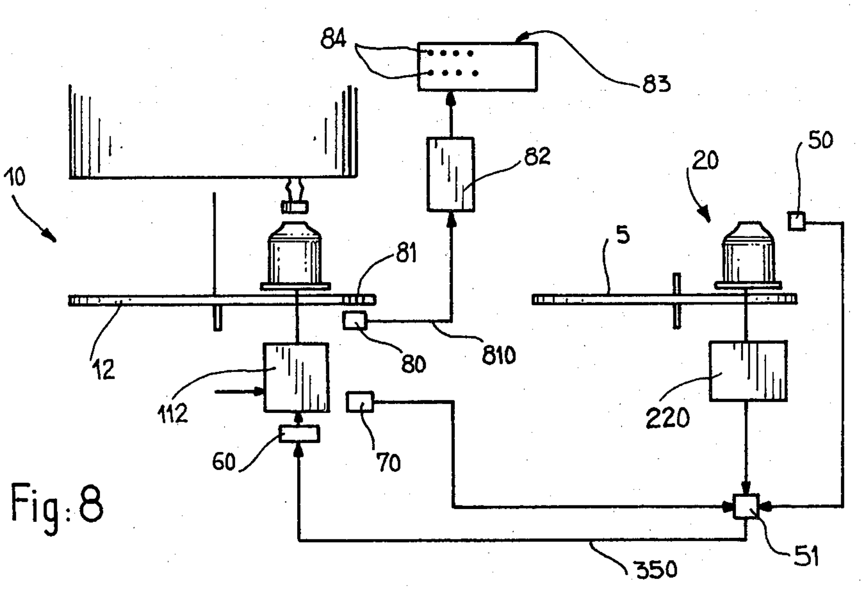
FIG. 8 is a diagramatic view of a second embodiment of the automatic correction device of the invention.

The embodiment shown in FIG. 8 distinguishes over the embodiment shown in FIG. 6 in that there is obtained an identification of the different balances 112 of the filling apparatus, said identification allowing a visual marking of the unserviceable or saturated balances controlled by the control device 70 and a corresponding inhibition of the correction signals from the comparison weighing station on the transfer platform. The external identification of a particular weighing station among the different weighing stations of the filling apparatus is obtained for example by means of a detecting device 80 in combination with identification means 81 on the table 12 of the filling apparatus or on any member of the filling machine rotating in synchronism with the filling apparatus. Identification and marking signals may be obtained directly in a binary form by having a detecting device 80 provided with a series of photocells analyzing optical marks 81 formed on the table 12 and representing a pure binary coding for each balance of the filling platform. For instance, with a filling platform having 24 stations, use may be made of 6 photocells, the coding being obtained for instance by means of 6 holes in the table, one of said holes serving for resetting a register of a demultiplexing device 82. Said demulteplexing device 82 controls a display device 83 comprising two aligned series of lamps 84, each series in a raw comprising a number of lamps corresponding to the number of the stations of the filling apparatus 12, i.e. in the present example 24 lamps, each lamp of a raw being assigned to a given weighing/metering station of the filling apparatus. Thus, extinction of a lamp of a raw will indicate saturation of a weighing/metering balance in a direction or in the other direction, whereby allowing a direct manual intervention on the considered balance and, eventually its exchange.

In addition to the periodicity of the control and eventually of the correction of each of the balances of the filling apparatus, it may be of interest, in order to not take systematically into account detected errors which result from temporary and non repetitive phenomena, to provide a continuous survey of the detected errors for each individual balance of the filling apparatus, for instance by storing the error signals, i.e. in the present case the correction signals, and to transmit a correction signal to the correction device only after having established the perseverance of the detected error in a given direction.

Figure 9:
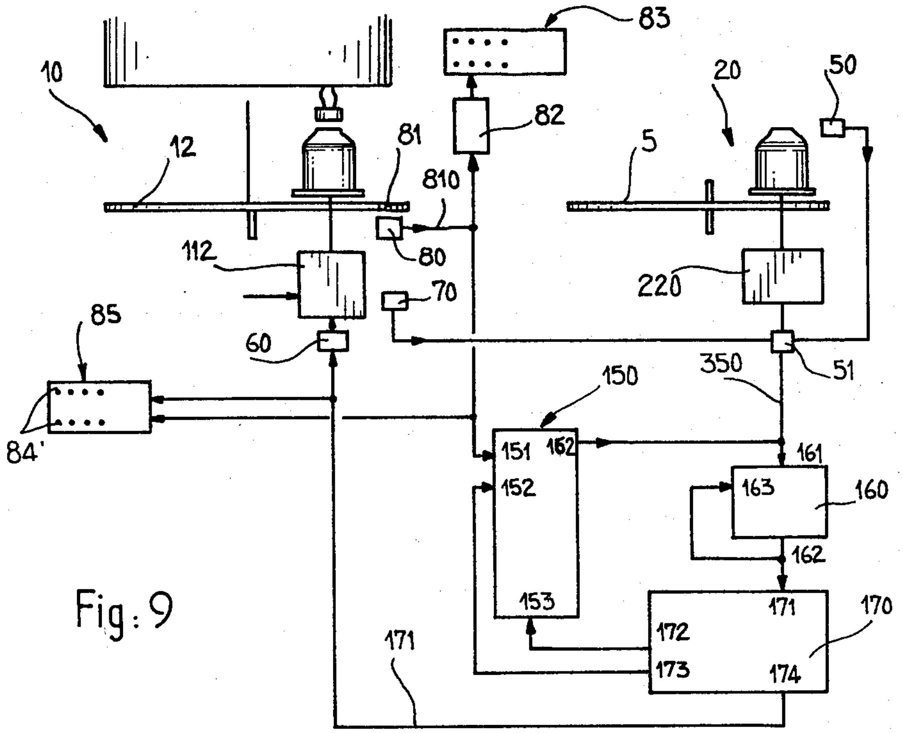
FIG. 9 is a diagrammatic view, partially in block diagrams, of a third embodiment of the automatic correction device of the invention.

FIG. 9 is diagramatic view of the electric circuit of a control device for carrying out the above mentioned correction method.

In the embodiment shown, between the comparison weighingerror detecting station 220 of the transfer platform and the correction device 60 is interposed an electronic logic circuit adapted to control the successive presence of "n" errors or correction signals for a same balance of the filling apparatus and to transmit accordingly a correction signal only when n successive error signals in the same direction have been recorded.

The electronic logic circuit essentially comprises an addressed memory 150 comprising at leat as many lines as the number of weighing stations in the filling platform, a n-position register 160 and a logic validation unit 170. The data output 810 of the identification detector 80 is fed both to the demultiplexing device 82 and to the line addressing input 151 of the memory 150, the output of which 152 is connected with the line 350 from the control weighing balance 220 and to the counting entry 161 of the counter 160. The counter output 162 is fed to the data input 171 of the validating unit 170 and to the reset entry 163 of the counter 160. The data output 172 of the validating unit 170 is connected to the data input 153 of the memory 150, the line-addressing control output 173 of the validating unit 170 being connected to the case-addressing input of a line 152 of the register 150. The "n" data output 174 is connected to the correction device 60 for the balances 112 of the filling apparatus.

With such an arrangement, for each balance of the rotating filling apparatus, the correction device 60 will be first actuated after n error signals in the same direction will be accounted within the counter 160. In practice, "n" will be selected for instance equal to 3 so as to obtain a convenient periodicity of the intervening steps on the weighing/metering balances in case of repetitive errors.

There is also shown in FIG. 9 a display and identification device 85 completing the display and identification device 83 and consisting, as the device 83, in two rows of lamps 84′, said device 85 being connected to lines 810 from the identification detector 80 and 171 from the validating unit 170. Thus, with said display and identification device 85, it is possible to identify the balance or the balances of the rotating filling apparatus which are involved in a correction process, i.e. which show repetitive weighing errors, whereby allowing easy inspection or control of said balances.

Figure 10:
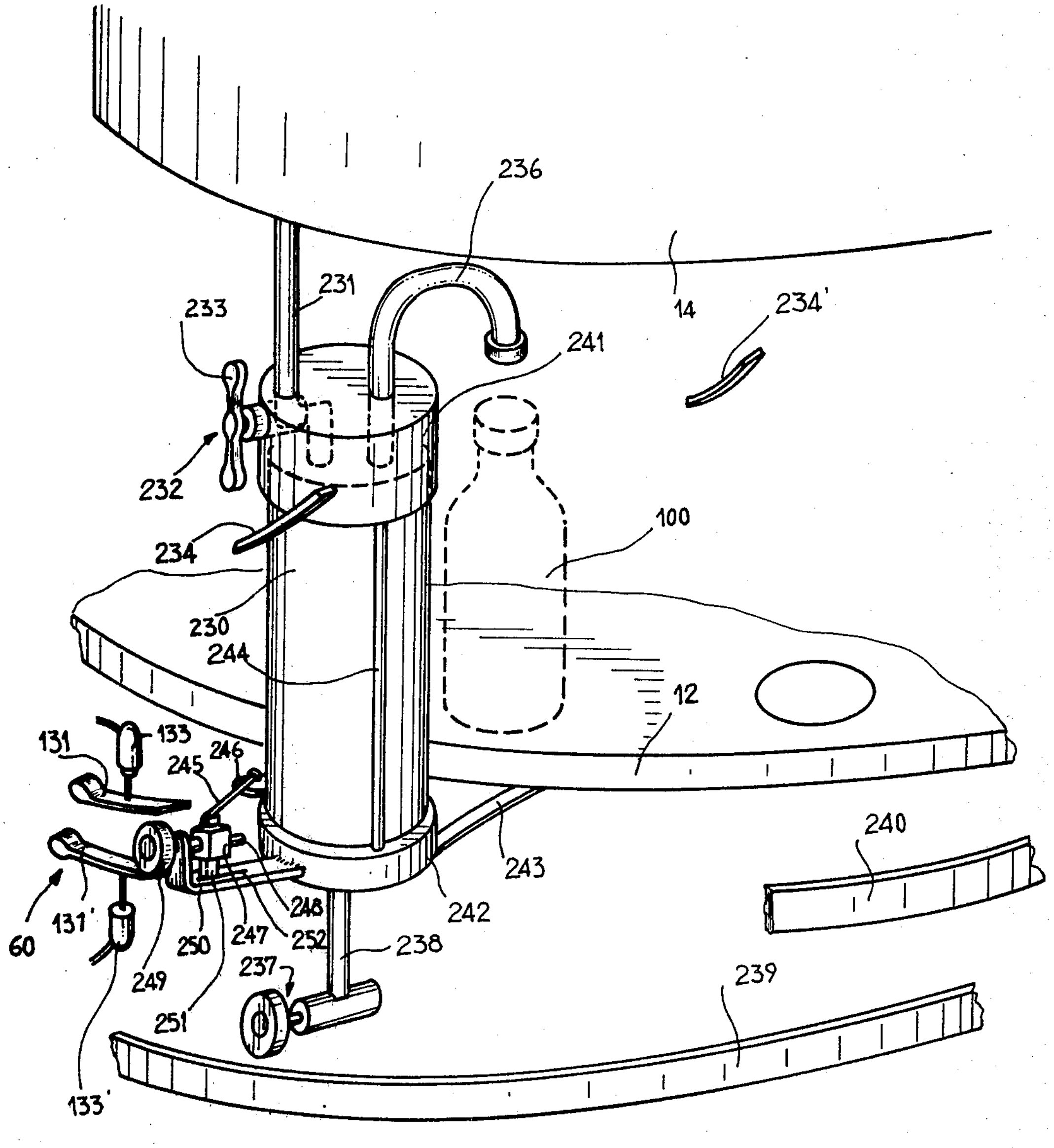
FIG. 10 is a schematic perspective view of a filling metering station of a volumetric filling apparatus equipped with a calibration correction device of the invention.

There is shown in FIG. 10 an embodiment of a volumetric filling apparatus adapted for correction of the preset filling value after a comparison weighing by means of a correction device 60 similar to the device disclosed in reference with the above embodiments. As it is known, in a volumetric filling apparatus the required quantity of material delivered into a container is preset as a volume, said volume corresponding, in the considered pressure and temperature conditions, to a given weight at the delivery end of the filling plant. In FIG. 10, there is only shown a volumetric filling device of a rotating filling apparatus comprising a rotating platform 12, each device being comprised by a volumetric pump of the piston type, wherein the piston is slidably received within a cylinder jacket 230. The suction and compression chamber of the pump within the jacket are selectively connected to the upper liquid tank 14 by a pump 231 through a barrel-type valve 232 provided with a rotating actuating lever the rotation of which in the direction of opening or of closing the valve is controlled successively by cam means 234 and 234′ stationary mounted on the frame of the apparatus on the circular path of the levers 233 of the different volumetric pumps so as, in a first time, to cause the filling by gravity of the inner chamber of the pump and, in a second time, to close the pipe 231 for allowing the piston of the pump to discharge the liquid within said chamber through a filling pipe 236 below which are successively disposed the containers 100 to be filled at said station.

Movement of the piston within the jacket 230 is controlled in synchronism with actuation of the lever 233 of the valve 232 by a roller device 237 mounted at the lower end of the piston rod 238 and cooperating successively with an operating ramp 239 for compression displacement of the piston and a return ramp 240 causing the piston to be returned downwardly in the cylinder. The nominal setting of the volume to be delivered by the pump is obtained for instance by adjusting the relative positioning of the control roller device 237 with respect to the top cylinder head 241 of the volumetric pump.

For carrying out correction of the setting of each volumetric delivering device according to the invention, the inner volume of the pump may be modified within a given range by causing the jacket 230 to longitudinally move with respect to the cylinder head 241. Therefore, in the embodiment shown, the jacket 230 is slidingly tightingly mounted between the cylinder head 241 and the cylinder base 242 which is rigidly attached to the platform 12 of the rotating filling apparatus by support members 243, the head 241 being made integral with the base 242 by means of spacing columns 244. Longitudinal displacement of the jacket 230 results from a relative angular displacement of the jacket 230 with respect to the base 242, through complementary ramp means provided on the cooperating portions of the jacket 230 and of the base 242. Angular displacement of the jacket with respect to its longitudinal symmetry axis is obtained by a link 245 hingedly mounted, on one hand on a protruding lug 246 rigidly attached to the jacket 230, and, on the other hand, on a yoke 247. The yoke comprises a taped bore within which is received a threaded rod 248. The rod carries at its outward end a roller 249 and is mounted for rotation within a tab 250 extending radially from the base 242 and integral therewith. The yoke 247 is provided with a protruding tab 251 slidingly received within a slot 252 in the tab 250. Thus, similarly to the correction mode disclosed in reference with FIGS. 3 and 4, during the rotation of the rotating filling apparatus and according to a given control position of the correction rails 131 and 131', while are shown here is superimposed relationship, a rotation of the roller 249 in rolling engagement with a rail 131, 131' will induce a linear displacement of the yoke 247 which in turn induces a relative rotation of the jacket 230 with respect to the base 242, i.e. a controlled variation of the internal volume of the volumetric pump around its nominal setting value.

Figure 11:
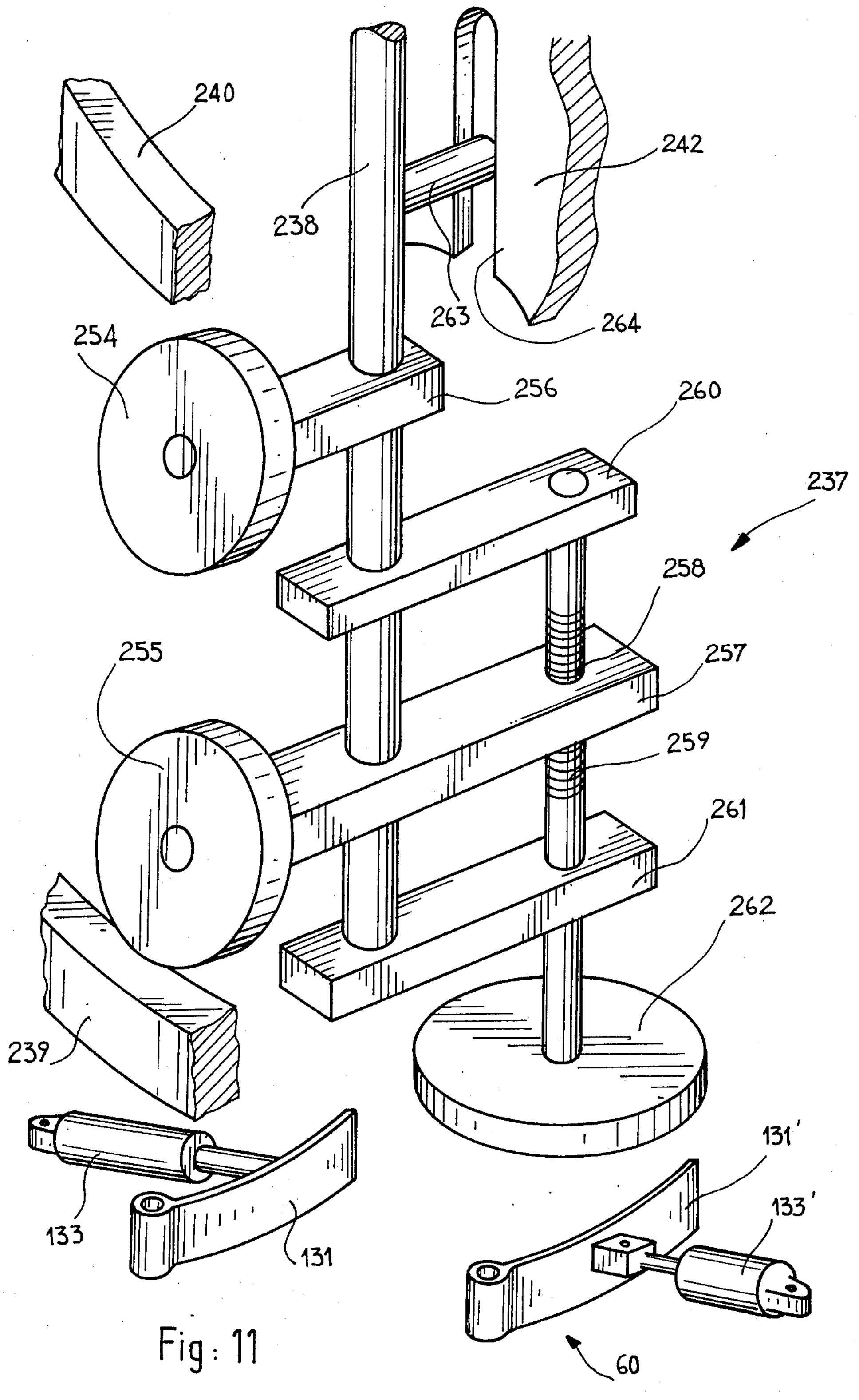
FIG. 11 is a perspective view of another embodiment of an automatic calibration correction device of the invention for a filling metering station of a volumetric filling machine.

There is schematically shown, in FIG. 11, another embodiment of a controllably settable volumetric pump for carrying out the method of the invention. In said embodiment, the control device 237 for controlling the run of the piston of the pump comprises rollers 254 and 255, among which at least one (here roller 255) is mounted for free axial displacement on the rod 238 of the piston. The roller 254, which cooperates with the return ramp 240, is rotatably mounted within a supporting block 256 integral with the rod 238. The roller 255, which cooperates with the delivery control ramp 239, is rotatably mounted within a supporting block 257 which is slidingly mounted on the rod 238 and is provided with a taped bore 258 within which is received a threaded rod 259, the opposite ends of which are rotatably mounted in bearing members 260, 261, rigidly connected to the piston rod 238. On the lower end of the threaded rod 259 is rigidly mounted a roller 262 extending in a direction substantially perpendicular to the direction of the axis of the rod 259 and adapted for cooperation, during rotation of the filling apparatus, with a correction device 60 of the type disclosed in reference with FIG. 4. With such an arrangement, and similarly to the setting correction disclosed in relation with FIGS. 3 and 4, a controlled rotation of the roller 262, as a result of its contact engagement with one of the rails 131, 131', causes, through the supporting block 257, a relative linear displacement of the roller 255 with respect to the piston rod 238. Since the control ramp 239 is stationary, it results therefrom a variation of the volume of the liquid delivered by the pump around the setting value. The piston rod 238 is slidingly guided and prevented from rotation by a stud 263 received within a groove 264 provided in the base 242 of the pump. Similarly, to sharpen the correction run, the roller 254 may also be mounted on the piston rod so as to be slidingly movable relatively thereto as the roller 255.

It will be understood that the control and correction systems disclosed with reference to the FIGS. 6 to 9 apply in the same way to the apparatus shown in FIGS. 10 and 11.

Similarly, in the case of a volumetric filling apparatus of the type embodying a vane pump, the setting of which is obtained by determining the number of relative rotations of the rotor, actuating pulses for the driving motor, may be corrected by pulses from a comparison weighing device 220 according to one of the control systems shown in FIGS. 7 to 9.

Although the present invention has been disclosed in reference with preferred embodiments, it is not restricted to the details of the present description but may include modifications and changes which will appear to those skilled in the art. More particularly, the control and correction device may be made operative only during the normal run of the filling machine, i.e. besides the normal periods of starting and stopping and besides the periods of the operating rate. Similarly, in lieu of a comparison weighing device operating in a hit or miss mode, it is possible to provide said device with an electronic weigher giving an analogic electric output and, accordingly, to associate the control and correction system with a computer unit for calculating for example a standard deviation and for giving information signals in the case the calculated standard deviation is established as being greater than a given threshold value. Moreover, additional outputs may be provided for connection of the control system to a printer for giving the operator a permanent direct reading of the measurements carried out by the control system or, with an additional bulk store, to give, through a call-in signal, a statement of the weighings for the different stations of the filling apparatus. It may also be of interest to separate, if required, the rotating filling apparatus and the rotating transfer/comparison platform either for reasons of geographical implantation or for completely withdrawing the transfer platform from the environmental conditions of the filling apparatus or, on the contrary, when the rotating apparatus has to be confined within a closed chamber, for instance for the packaging of dangerous, volatile or sterile products. In these cases, the transfer device between the remote rotating apparatus may include all kind of transfer mechanisms insuring a synchronisation of the mechanical train, such as for instance transfer worms, brackets, chains or belts, or overshot wheels or conveyors, whereby permitting the transfer comparison weighing platforms to be separated and isolated from the rotating filling apparatus.

What I claim is:

1. A method of automatically controlling an apparatus for filling containers including a plurality of filling stations, each having a controllable filling device, each actuated individually for delivering a metered amount of filling material into continuously successively forwarded containers during a filling cycle, comprising the following steps:

sequentially automatically taking individual containers among the successive containers filled at stations in the filling apparatus;

weighing successively each of said thus taken filled containers at a movable control weighing station on a continuous conveying path for the containers;

comparing each said weighing to a predetermined value image of said metered amount of filling material to be delivered into each container;

establishing a correlation between each container which has been weighed at said control weighing station and the corresponding said filling station of said filling apparatus where each said weighed container has been filled; and automatically correcting, as a result of said control weighing, the corresponding said filling device of the filling apparatus.

2. A method according to claim 1, wherein the taking and the correlation are effected mechanically by means of transfer devices for conveying the containers, at least one of said devices having a number or receiving stations for the containers, said number and the number of said filling stations in said filling apparatus being incommensurable numbers, said control weighing being carried out on a given station among said receiving stations of said at least one transfer device.

3. A method according to claim 2, for automatic control of a weighing filling apparatus having a metering balance at each of said filling stations, wherein said correction of said filling devices consists in correcting the setting of said weighing balances of said filling apparatus.

4. A method according to claim 2, for automatic control of a volumetric filling apparatus having a volumetric filling device at each of said filling stations, wherein said correction of said filling devices consists in correcting the preset metering volume of said volumetric filling devices of said filling machine.

5. A method according to claim 1 wherein a correction of a said filling device is effected for a said control weighing beyond a predetermined threshold weight value.

6. A method according to claim 1, wherein a correction of a said filling device is effected for a predetermined number of said control weighings beyond a predetermined threshold weight value.

7. A method according to claim 1, further comprising the step of display identifying each said filling station giving to at least one overweighing at said comparison weighing station.

8. A device for automatically controlling a filling machine comprising at least a rotating filling apparatus having n filling stations, each comprising a controllable individually actuated filling device, a rotating transfer apparatus having $n_1$ stations for receiving containers which have been filled in said filling apparatus and including $n_1 - 1$ passive container receiving stations and one container receiving control weighing station, a transfer means for taking successively the totality of said containers filled in said rotating filling apparatus and for transferring same to said rotating transfer apparatus, $n_1$ and n being incommensurable numbers, comparison means associated to said control weighing station of said rotating transfer apparatus, correcting means operatively connected to said comparison means for selectively and individually correcting said filling devices of said filling stations of said rotating filling apparatus, and means for continuously taking said filled containers from said rotating transfer apparatus.

9. A device according to claim 8, wherein said transfer means comprises at least a transfer wheel arranged in series between said rotating filling apparatus and said rotating transfer apparatus for cooperation with said apparatuses, means being provided for rotating all said integers in synchronism.

10. A device according to claim 9, wherein said control weighing station of said rotating transfer apparatus comprises a balance adapted for periodically cooperating during rotation of said rotating transfer apparatus with detecting members stationary located adjacent the circular path of said balance when said rotating transfer apparatus is rotated.

11. A device according to claim 10, wherein said control weighing station of said rotating transfer apparatus comprises a mechanical balance having a beam, said comparison means comprising adjustable sensors for detecting the position of said beam of said balance.

12. A device according to claim 11, wherein said sensors are positioned in a given stationary location adjacent the circular path followed by a protruding portion of said beam upon rotation of said rotating transfer apparatus.

13. A device according to claim 12, further comprising identification and display means for the different said stations of said rotating filling apparatus electrically associated to said sensors.

14. A device according to claim 8, wherein said correcting means comprises actuable mechanical members hingedly mounted on a stationary frame member in a fixed relationship with respect to the axis of rotation of said rotating filling apparatus and adapted for cooperation with actuable control members for controlling the setting of said filling devices during rotation of said rotating filling apparatus.

15. A device according to claim 14 for automatic control of a weighing rotating filling machine having a metering balance at each of said filling stations, wherein said control members for controlling the setting comprise mechanical means adapted for individually and selectively modifying the balancing of each of said metering balances of said rotating filling apparatus upon rotation thereof.

16. A device according to claim 15, wherein each said metering balance of said filling stations comprises a beam and at least a roller means connected to said beam and adapted to cooperate with controllably hinged ramp means belonging to said correcting means and in a determined location adjacent the circular path said rollers follow during rotation of said filling apparatus.

17. A device according to claim 15, wherein said control weighing station of said rotating transfer apparatus comprises a mechanical balance having a beam, said comparison means comprising adjustable sensors for detecting the position of said beam of said balance.

18. A device according to claim 14, for automatic control of a volumetric filling machine having a volumetric metering device at each of said filling stations thereof, comprising means for selectively modifying the volume delivered by each of said metering devices and cooperating with said correcting means.

19. A device according to claim 18, comprising mechanical means for selectively and controllably varying the internal capacity of each said metering devices, said mechanical means being adapted for cooperation with said mechanical correcting means during rotation of said rotating filling apparatus.

20. A device according to claim 19, wherein each said metering device comprises a volumetric pump having a piston and an actuating rod, and wherein said mechanical means comprises for each of said pumps a roller means connected to said rod and adapted for cooperation with controllable hingedly mounted ramp means belonging to said correcting means and in a determined location adjacent the circular path said roller means follows upon rotation of said filling apparatus.

* * * * *